United States Patent
Aonuma

(10) Patent No.: US 9,320,973 B2
(45) Date of Patent: Apr. 26, 2016

(54) GAME SERVER, GAME CONTROLLING METHOD, GAME PROGRAM RECORDING MEDIUM, AND GAME SYSTEM

(71) Applicant: gloops, Inc., Tokyo (JP)

(72) Inventor: Chisato Aonuma, Tokyo (JP)

(73) Assignee: GLOOPS, INC., Tokyo (JP)

( * ) Notice: Subject to any disclaimer, the term of this patent is extended or adjusted under 35 U.S.C. 154(b) by 0 days.

(21) Appl. No.: 14/541,166

(22) Filed: Nov. 14, 2014

(65) Prior Publication Data
US 2015/0151202 A1  Jun. 4, 2015

(30) Foreign Application Priority Data

Nov. 20, 2013  (JP) .................................. 2013-239772

(51) Int. Cl.
| | |
|---|---|
| A63F 13/12 | (2006.01) |
| A63F 13/35 | (2014.01) |
| A63F 13/69 | (2014.01) |
| A63F 13/822 | (2014.01) |

(52) U.S. Cl.
CPC .................. *A63F 13/35* (2014.09); *A63F 13/69* (2014.09); *A63F 13/822* (2014.09)

(58) Field of Classification Search
USPC ...................................................... 463/31, 42
See application file for complete search history.

(56) References Cited

U.S. PATENT DOCUMENTS

| | | | |
|---|---|---|---|
| 2012/0309543 A1* | 12/2012 | Shimada .................. | H04N 5/76 463/42 |
| 2013/0079078 A1* | 3/2013 | Jung ...................... | A63F 13/005 463/9 |

FOREIGN PATENT DOCUMENTS

JP  2012-024248 A  2/2012

OTHER PUBLICATIONS

"Bahamut Brave", magazine, Nov. 15, 2011, p. 41, App Style vol. 5 Koiunreki November Extra Edition, Eastpress.
Taro Oishi, Standard of Social Game will change: "Diffusion Million Arthur, Internet Website", May 19, 2012, Kadokawa Corporation, URL: http://iphone.ascii.ne.jp/2012/05/19/%E3%82%BD%E3%83%BC%E3%82%B7%E3%83%A3%E3%83%AB%E3%82%B2%E3%83%BC%E3%83%A0%E3%81%AE%E5%9F%BA%E6%BA%96%E3%81%8C%E5%A4%89%E3%82%8F%E3%82%8B%EF%BC%9A%E6%8B%A1%E6%95%A3%E6%80%A7%E3%83%9F%E3%83%AA%E3%82%AA/.

* cited by examiner

*Primary Examiner* — Pierre E Elisca

(57) ABSTRACT

A game data processing section 100 is provided with an item assessment section 41 and an event generation section 42. The item assessment section 41 assesses whether or not the number of pieces of a virtual item possessed by a virtual user is equal to or more than a predetermined threshold value, extracts one type of virtual item from among virtual items possessed by the virtual user, and assesses whether or not the number of pieces of the one type of virtual item is equal to or more than the predetermined threshold value. The event generation section 42 generates an event in which the one type of virtual item can be consumed, when the item assessment section assesses the number of pieces of the one type of virtual item is equal to or more than the predetermined threshold value.

10 Claims, 14 Drawing Sheets

FIG. 6

|   |   | 211 |
|---|---|---|
| Item ID | Item Type | Item Image |
| 10001 | Quest item | ・・・ |
| 10002 | Battle item | ・・・ |
| 10003 | Gacha item | ・・・ |
| 10004 | Combination item | ・・・ |

| Item ID | Threshold value (depending on level) | | |
|---|---|---|---|
|  | 100 or lower | 101 to 299 | 300 or higher |
| 10001 | 50 | 100 | 150 |
| 10002 | 50 | 80 | 100 |
| 10003 | 20 | 30 | 40 |
| 10004 | 50 | 80 | 100 |

| Item ID | Threshold value (depending on rank) | | |
|---|---|---|---|
|  | 501 or lower | 101 to 500 | 100 or upper |
| 10001 | 50 | 100 | 150 |
| 10002 | 50 | 80 | 100 |
| 10003 | 20 | 30 | 40 |
| 10004 | 50 | 80 | 100 |

FIG. 8

| Item ID | Event in which virtual items can be consumed |
|---|---|
| 10001 | Appearance of secret route |
| 10002 | Appearance of monster |
| 10003 | ... |
| 10004 | ... |

| Relationship between number of pieces in possession and threshold value | Difference from threshold value (number of pieces) | Monster appearance probability |
|---|---|---|
| Less than threshold value | — | 2 per one area |
| Equal to or more than threshold value | 1 to 5 | 3 per one area |
| | 6 to 10 | 5 per one area |
| | 11 to 20 | 8 per one area |
| | 21 to 50 | 10 per one area |
| | 51 or more | 15 per one area |

| Relationship between number of pieces in possession and threshold value | Difference from threshold value (number of pieces) | Monster appearance probability | | |
|---|---|---|---|---|
| | | A rank | B rank | C rank |
| Less than threshold value | — | 10 | 30 | 60 |
| Equal to or more than threshold value | 1 to 5 | 15 | 32 | 53 |
| | 6 to 10 | 20 | 35 | 45 |
| | 11 to 20 | 25 | 40 | 35 |
| | 21 to 50 | 30 | 45 | 25 |
| | 51 or more | 40 | 50 | 10 |

GAME SERVER, GAME CONTROLLING METHOD, GAME PROGRAM RECORDING MEDIUM, AND GAME SYSTEM

CROSS REFERENCE TO RELATED APPLICATIONS

This application claims priority to Japanese Patent Application No. 2013-239772 filed on Nov. 20, 2013, the entire contents of which are incorporated by reference herein.

BACKGROUND OF THE DISCLOSURE

1. Field of the Disclosure

The present disclosure relates to a game server that manages an action of a virtual user existing in a virtual space using operation data from each terminal connected via a communication network, a method of controlling a progress of a game provided by the game server, a game program recording medium, and a game system.

2. Description of the Related Arts

Recently, social network games (hereinafter referred to as social games), which are games provided using a Social Networking Service (SNS), are becoming more common with the spread of high-end portable terminals such as smartphones. A social game is a game in which a physical user operating a terminal controls, via a communication network, a virtual user that exists in a virtual space established by a game server to play a game online while communicating with other virtual users existing in the same virtual space.

For example, one of such types of social games may be a game in which, depending on an action of the virtual user or a story, a single story or scenario is established by combining a plurality of game parts (which can be different from each other) such as a quest part, a battle part, a combination part, and a gacha part to constitute a single game. (e.g., see Japanese Laid-Open Patent Publication No. 2012-24248).

In such a game, there are items which can be used by the virtual user within the game (hereinafter, this item is referred to as "virtual item" since this item is used within the virtual space). The virtual item may be, for example, a quest item helpful for proceeding an adventure route in the quest part, a battle item helpful for defeating an enemy in the battle part, etc. These virtual items can be obtained during the game play, or can be obtained as a login bonus given as a reward for logging in the game.

As the game progresses, the virtual user would have a larger number of opportunities for obtaining the virtual items, and would have surplus virtual items which are difficult to be consumed in the game. In the game, the upper limit is set regarding the number of pieces of a virtual item which can be possessed by a virtual user. Here, the term "piece" is used to count a number of a virtual item itself, and also used to count a number of partial components of a virtual item. Generally, there may be settings that when the number of pieces of a virtual item in possession exceeds the upper limit number, no other new piece of the virtual item can be obtained, or the pieces of the virtual item already in possession are automatically removed from the oldest piece. In these cases, in order to obtain a new piece of the virtual item, or in order to prevent a necessary virtual item from being automatically removed, the virtual user is required to delete, virtually "sell", etc., a surplus virtual item. There has been a potential desire for a measure that the user is provided with opportunities for effectively consuming obtained virtual items through playing the game.

The present disclosure has been contrived based on the aforementioned disadvantages and it is an object of the present disclosure to provide a game server which can provides a game in which surplus virtual items obtained in the game can be effectively consumed in the game play, a game controlling method of controlling the progression of a game provided by the game server, a game program recording medium which records a game program, and a game system.

SUMMARY

The present disclosure provides a game server that manages an action of a virtual user existing in a virtual space using operation data from each terminal connected via a communication network, and that is provided with an item assessment section which assesses whether or not the number pieces of a virtual item possessed by the virtual is equal to or more than a predetermined threshold value, and an event generating section which, when the item assessment section assesses that the number of pieces of one type of virtual item is equal to or more than the predetermined threshold value, generates an event in which the virtual user can consume the one type of virtual items.

BRIEF DESCRIPTION OF THE DRAWINGS

FIG. 6 is a diagram for explaining a specific example of an item data table.

FIG. 7A is a diagram for explaining a specific example of a threshold value data table.

FIG. 7B is a diagram for explaining a specific example of a threshold value data table.

FIG. 8 is a diagram for explaining a specific example of an event content data table.

FIG. 9A is a diagram for explaining a specific example of an event generation probability data table.

FIG. 9B is a diagram for explaining a specific example of an event generation probability data table.

DESCRIPTION OF THE DISCLOSURE

Figure 1:
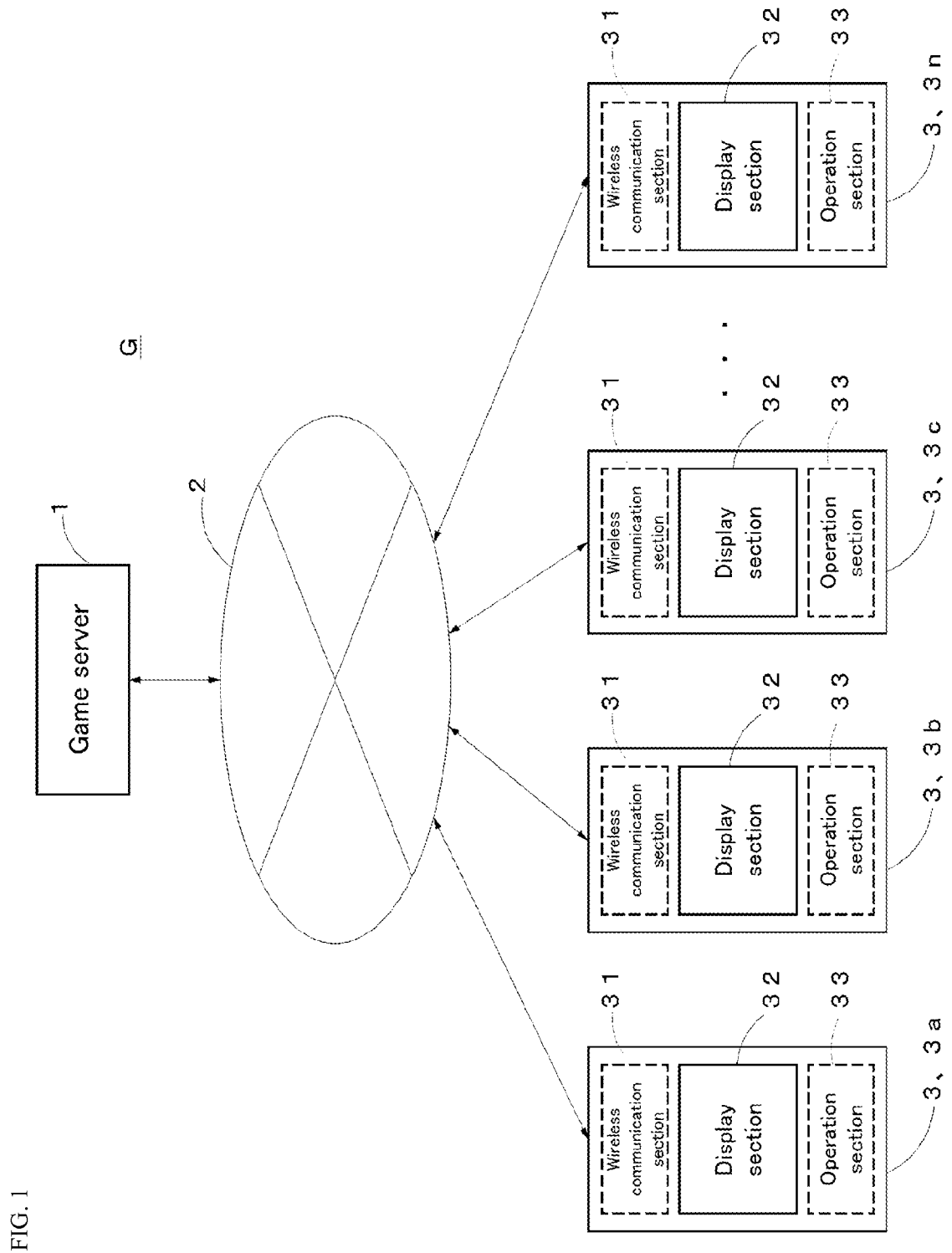
FIG. 1 is a diagram showing a system configuration of a game system of the present disclosure.

An embodiment of the present disclosure will be explained with reference to specific examples. The present embodiment relates to a game system which provides a game to a terminal connected to a game server via a communication network. Specifically, as shown in FIG. 1, the game system G is provided with game server 1 which provides a game to a user, and terminals 3a, 3b, 3c, . . . , 3n (hereinafter, collectively referred to as a terminal 3) connected to the game server 1 via a communication network such as the Internet 2.

In the following description, the definitions of terms will be clarified, a general outline of a social game concerning the present embodiment will be described, and thereafter, a configuration of the game system G and a process performed by the game system G will be described in detail.

(1) Definitions of Terms

The definitions of terms used in the present embodiment are as follows.

"Virtual space" means a virtual world that is created during a game based on content of the game and refers to a space different from a physical space. The "virtual space" shown on a display (a display section) of the terminal 3 is two-dimensional. However, the "virtual space" does not have to be a two-dimensional space. Conceptually, for example, a virtual space higher than the two-dimensional one may be formed by cooperation of a plurality of terminals 3.

"Physical user" means an entity operating a terminal, i.e., a person. "Virtual user" means a virtual entity representing the physical user in the virtual space in accordance with a button operation or a touch operation on the terminal of the physical user, or a virtual entity which is created based on a taste or preference of the physical user. The "virtual user" includes, for example, a virtual entity like a player in conventional shogi games or mahjong games that is not visible in the game but operates pieces or tiles in the virtual space as an existence representing the "physical user". The "virtual user" also includes a particular visible character that is displayed in the game such as a role playing game or a player-versus-opponent game and that moves or performs an action. Further, the "virtual user" includes a virtual entity displayed as an avatar in a SNS. Accordingly, the "virtual user" in the present embodiment is used as a term that broadly represents the virtual entity in the virtual space, regardless of whether it is a virtual entity which is embodied in a game or a virtual entity which is not embodied (2) General Outline of Social Game Next, a general outline of a social game provided from the game server 1 to the terminal 3 connected via the Internet 2 will be described with reference to FIG. 2.

Generally, a social game is a game played in a virtual space by a virtual user performing an action in response to an operation of the terminal 3 by the physical user. A type of the social game is a game in which a set of a predetermined number of cards (hereinafter, referred to as a card deck) is created from among various kinds of, e.g., several hundreds of kinds of, virtual cards (hereinafter, simply referred to as cards) each having a character displayed thereon. More specifically, the physical user tries to raise the level of the cards and raise the level associated to the virtual user himself/herself by selecting a group of the card, battling against enemies appearing in the virtual space using the cards constituting the deck, and updating level information (upgrading, etc.) set for each card which constitutes the deck. The physical user also tries to collect the cards by trading the cards with another virtual user within the virtual space. In a battle using the cards constituting the deck, a damage to an enemy or a result of the battle is determined based on parameters such as the level of offensive and defensive powers of each card constituting the card deck, a skill (corresponding to a "meld" as used in a card game or mahjong) with which a certain effect can be obtained by a predetermined combination of cards, and so on.

Figure 2:
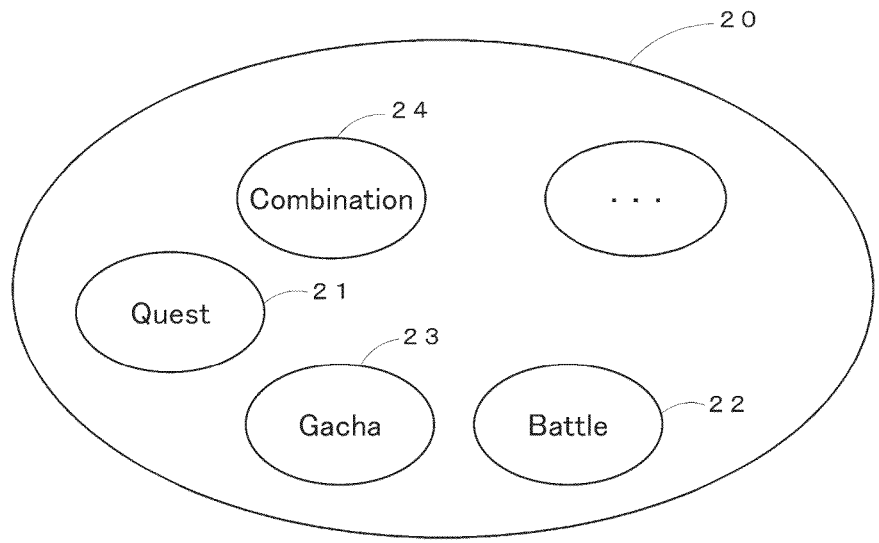
FIG. 2 is a diagram for explaining a configuration of a social game provided by a game server of the present disclosure.

This type of social game is established as a single game by organically combining a plurality of game parts (hereinafter, simply referred to as "parts") to complete a single story or a character as a whole. For example, as shown in FIG. 2, a social game 20 includes a quest part 21, a battle part 22, a Gacha-part 23 (Gacha-Part; a lottery part), and a combination part 24.

As represented by the term "quest", which means "to search, to explore and to have an adventure" or the like, the quest part 21 is a part constituting a game in which a virtual user travels throughout in the virtual space, battles against enemies that appear during the travel, obtains a new card, and improves the level of the virtual user. In the quest part 21, the virtual user is given a predetermined number of quest points and battle points. Actions such as a movement of the virtual user, an obtainment of an item, an improvement of the level, and so on, are accomplished by consuming the quest points. Moreover, in the quest part 21, the virtual user battles against an enemy that has appeared by using parameters of the possessed cards and consuming the battle points.

The battle part 22 is a part in which the virtual user uses a deck constituted by the cards in possession to battle against an enemy, i.e., another virtual user. A win or a loss is determined based on the offensive power and the defensive power of each of the cards constituting the aforementioned deck.

The Gacha part 23 is a part named after "gacha-gacha" (registered trademark) which is a lottery-like game, and the term "gacha-gacha" is an imitative word expressing the sound and manner in which a capsule toy, which is a toy enclosed in a capsule, is ejected from a toy vending machine after a coin is inserted into the machine. In the Gacha part 23, the virtual user obtains a card randomly based on an occurrence rate of each card by using, for example, a gacha point or gacha authorization (the right for play lottery) that is virtually provided instead of a coin.

The combination part 24 is a part in which cards possessed by the virtual user are "combined" to increase the card level representing the strength of the cards, so as to increase an offensive power for damaging enemies and/or a defensive power for defending from enemies during a battle, when the cards are provided in the deck.

The social game 20 constituted by the plurality of parts described above has been meaningful as the entirety of the game because each game part is not independent from each other, but is correlated and combined with the other, as described above. Therefore, the social game 20 can be progressed as a whole when the virtual user effectively progresses each of the game parts.

(3) Basic Hardware Configuration (3-1) Configuration of Terminal

Hereinafter, a hardware configuration for obtaining a game system G of the present embodiment will be described based on the definition of the social game 20 described above As shown in FIG. 1, the terminal 3 may be a portable wireless communication terminal, and may include, for example, a wireless communication section 31, a display section 32, and an operation section 33. The wireless communication section 31 is connected to the Internet 2 through a mobile telephone line or a wireless LAN circuit to execute processes as a web browser, and performs data communication with the game server 1. The display section 32 displays a screen of the web browser, and executes the display based on the data received form the game server 1. The operation section 33 is, for example, a touch panel to be laid on the screen of the display section 32 for receiving input operation by the physical user. The data representing the input operation received from the physical user (operation data) is transmitted from the wireless communication section 31 to the game server 1.

With the terminal 3 having such a hardware configuration, for example, an individual authentication process of the terminal 3 is performed by using, for example, a combination of pre-registered user identification information (user ID) and a predetermined password. When the authentication between the terminal 3 and the game server 1 is complete, the terminal 3 receives data necessary for progressing the game from the game server 1, and also, transmits operation data which has been received from the physical user through the operation section 33 to the game server 1.

The terminal 3 can be a mobile telephone, a Personal Digital Assistant (PDA) or a personal computer as long as it is a communication device capable of communicating with the game server 1 via a communication network such as the Internet 2. The operation section 33 has been described as a touch panel by way of example, but may be a keyboard, etc., or of a configuration in which information is input through a selection operation by moving a cursor with a physical key operation.

(3-2) Schematic Configuration of Game Server

Figure 3:
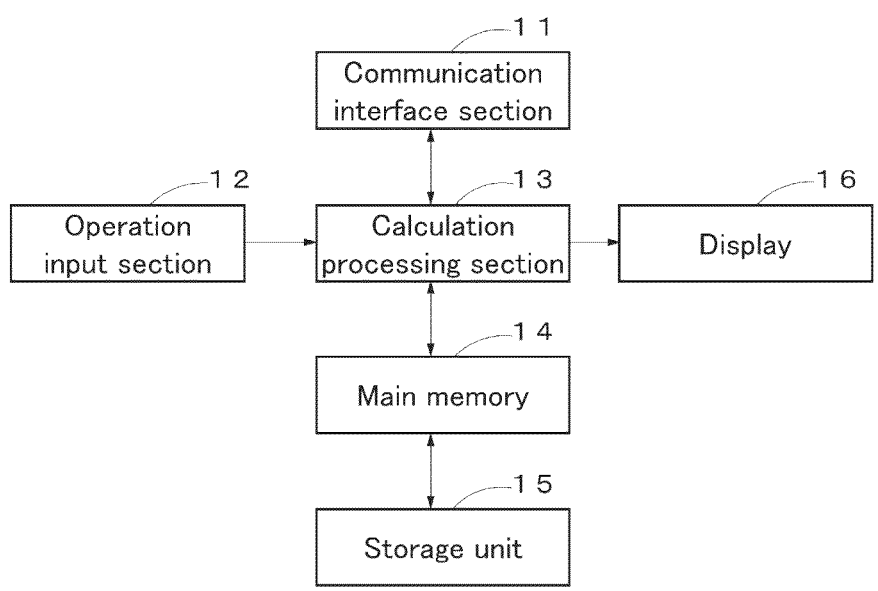
FIG. 3 is a diagram showing a hardware configuration of the game server of the present disclosure.

The game server 1 to be communicably connected to the terminal 3 is embodied as a computer having a general-purpose hardware configuration as shown in FIG. 3, for example. That is to say, as shown in FIG. 3, the game server 1 is provided with a communication interface section 11 that establishes communications with the terminal 3 via the Internet 2, and an operation input section 12 such as a keyboard or a mouse that allows an operation input from a physical user. Further, the game server 1 is provided with an arithmetic processing section 13 such as a CPU that executes various arithmetic processing, a main memory 14 such as an SRAM or a DRAM that temporarily stores arithmetic processing data, a storage unit 15 such as a hard disk in which application programs and various data are stored. In addition, the game server may also be provided with a display 16 that displays an outcome of the arithmetic process.

The game server 1 contains a program which provides the aforementioned social game 20 to the physical user, in the storage unit 15. Thereby, in function, the game server 1 is with a configuration as shown in FIG. 4.

Figure 4:
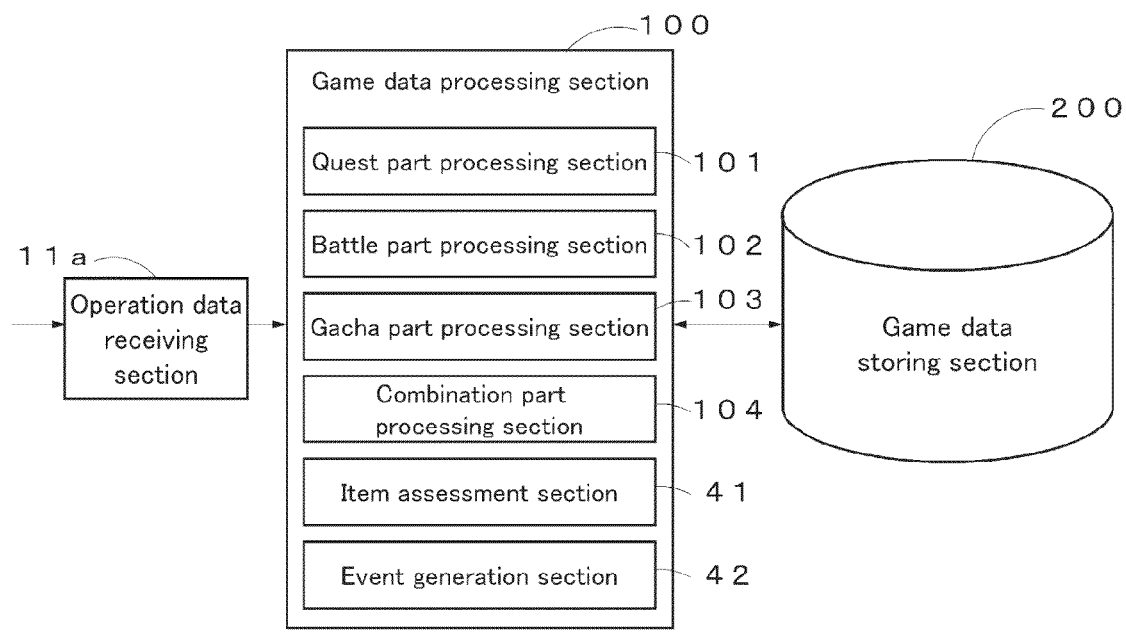
FIG. 4 is a diagram showing a configuration of each processing section executed by the game server of the present disclosure.

That is to say, the game server 1 comprises, as shown in FIG. 4, an operation data receiving section 11a, a game data processing section 100, and a game data storing section 200 that manages game data.

The operation data receiving section 11a receives operation data transmitted from the terminal 3 through the communication network 2. The game data processing section 100 comprises a quest part processing section 101, a battle part processing section 102, a gacha part processing section 103, a combination part processing section 104, an item assessment section 41, and an event generation section 42.

Here, the quest part processing section 101 executes data processing for the quest part 21. The battle part processing section 102 executes data processing for the battle part 22. The gacha part processing section 103 executes data processing for the gacha part 23. The combination part processing section 104 executes data processing for the combination part 24. The item assessment section 41 and the event generation section 42 are described in detail below.

(3-3) Specific Configuration of Game Server

Hereinbelow, specific configurations of the game data processing section 100 having a characteristic configuration in the present embodiment, and the game data storing section 200 serving as a storage area for executing the processes in the game data processing section 100, will be described with reference to FIG. 5, etc. First, the configuration of the game data storing section 200 will be explained.

(3-3-1) Configuration of Game Data Storing Section

Data to be used in the game data processing section 100 is stored in the game data storing section 200. As shown in FIG. 5, the game data storing section 200 contains an item data table 211, a threshold value data table 212, an event content data table 213, an event generation probability data table 214, an event generation period data table 215, and a virtual user data storing section 210.

(Item Data Table 211: FIG. 6)

As shown in FIG. 6, the item data table 211 manages virtual items which can be used in the game as a list.

Each virtual item is provided with a unique value (in the present example, a numeral value) as "item identification information (item ID)".

As shown in FIG. 6, item ID 10001 refers to a quest item which can be used in the quest part 21. Item ID 10002 is a battle item which can be used in the battle part 22. In the present example, the quest item has a function to restore the quest point that the virtual user has consumed in the quest part 21, and the battle item has a function to restore the battle point which has been consumed in the battle part 22. During the game, the quest points may be provided to the virtual user after a predetermined time period has passed, such that one point can be restored in 3 minutes. In this case, when the virtual user has consumed 100 quest points, all the quest points can be restored after 5 hours. However, in order to restore the quest points immediately, the physical user uses the quest item.

As shown in FIG. 6, item ID 10003 is a gacha item which can be used in the gacha part 23. The gacha item has a function to provide the virtual user with a card which can be used in the game.

As shown in FIG. 6, item ID 10004 is a combination item which can be used in the combination part 24. The combination item has a function to increase parameters such as offensive power or defensive power indicated on the virtual card.

"Item image" refers to image data representing a virtual item. When the virtual item is displayed, display processing data including the image data is transmitted from the game server 1 to the terminal 3.

(Threshold Value Data Table 212: FIG. 7)

As shown in FIG. 7A and FIG. 7B, the threshold value data table 212 stores threshold value information which is used when assessing whether or not the number of pieces of a virtual item possessed by each virtual user is equal to or more than a predetermined threshold value. The threshold value is different for each attribute value of the virtual user. The attribute value of the virtual user may be a level, a rank, the number of fellows, the number of login times to the game, etc. According to an example of the present embodiment, the higher the attribute value of the virtual user, the higher the threshold value. The threshold value data table 212 shown in FIG. 7A stores threshold values corresponding to the ranges to which the attribute value of the virtual user belongs. The threshold value data table 212 shown in FIG. 7B stores threshold values based on the rank of the virtual user in the game.

"Level" is a numerical value representing the degree of progress of the virtual user in the game. "Experience value" is a parameter which increases as the virtual user accomplishes a predetermined mission, and when the "experience value" reaches a specific value, the "level" of the virtual user is raised. The experience value and the level may have a constant proportional relationship, or may be related such that as the level becomes higher, the experience value required for raising the level by one step becomes larger. For example, when the experience value reaches 100, the level is raised from 1 to 2, and thereafter, when the experience value further increases by 120, the level is raised from 2 to 3.

"Rank" is a numerical value representing the position of the virtual user in the game. The rank can be determined based on the count during a limited period. For example, the rank can be determined on the basis of the count for one day, one week, or one month. The parameters to be used in the game for calculating the rank may be, for example, the number of defeated monsters (enemies), the number of obtained virtual boxes arranged on the adventure route (virtual path set in the virtual space), and the like.

(Event Content Data Table 213: FIG. 8)

As shown in FIG. 8, the event content data table 213 stores event information in which each virtual item can be used. For example, the case where a secret route in addition to the normal adventure route is appeared in the quest part during an event generation period, is supposed. When this "secret route appearance" event is set as an event in which the virtual item (quest item) with ID 10001 can be used, item ID 10001 is recorded in relation to information specifying the "secret rout appearance" event. Further, when assuming that a monster is appeared in the battle part during the event generation period, and the "monster appearance" event is set as an event in which the virtual item (battle item) with item ID 10002 can be used, item ID 10002 is recorded in relation to the "monster appearance" event.

(Event Generation Probability Data Table 214: FIG. 9)

As shown in FIG. 9, the event generation probability data table 214 stores probability information representing the probability that an image relating to an event is output to each terminal 3, namely, the probability that an event is generated on the operation screen of each terminal 3. Specifically, the event generation probability data table 214 shown in FIG. 9 stores probability information in the "monster appearance" event. As mentioned above, according to an example of the present embodiment, the "monster appearance" event is an event generated in the battle part. Here, "monster" is a target functioning as an enemy of the virtual use in the virtual space. The physical user can defeat the monster by operating a button icon and the like indicated as "attack", etc., displayed on the operation screen. The object functioning as an enemy is not limited to the monster, but can be another virtual user.

The event generation probability data table 214 shown in FIG. 9A stores the average number regarding the monsters to be appeared in one area. The larger the average number of the monsters to be appeared in one area, the higher the monster appearance probability. Here, "area" refers to a specific territory in the battle part, and can be replaced by a stage or a field depending on games.

The event generation probability data table 214 shown in FIG. 9B stores appearance probabilities regarding three monsters in different ranks As shown in FIG. 9B, for example, the "monster rank" is represented by "A rank", "B rank", "C rank" in the order from the top. The upper the monster rank, the more useful virtual item can be set as a virtual item which can be obtained by the virtual user when the monster is defeated. When the target is another virtual user, the monster rank can be replaced by the level of the target virtual user.

According to the settings in the example shown in FIG. 9A, when the number of pieces of a virtual item possessed by each virtual user is equal to or more than a predetermined threshold value, the monster appearance probability becomes higher, compared to the case where the number of pieces of the virtual item is lower than the predetermined threshold value; and the larger the difference between the number of pieces of the virtual item and the predetermined threshold value, the higher the monster appearance probability. According to the settings shown in FIG. 9B, when the number of pieces of a virtual item possessed by each virtual user is equal to or more than a predetermined threshold value, the appearance probability of the upper ranked monster becomes higher, compared to the case where the number of pieces of the virtual item is lower than the predetermined threshold value; and the larger the difference between the number of pieces of the virtual item and the predetermined threshold value, the higher the appearance probability of the upper ranked monster.

Figure 10:
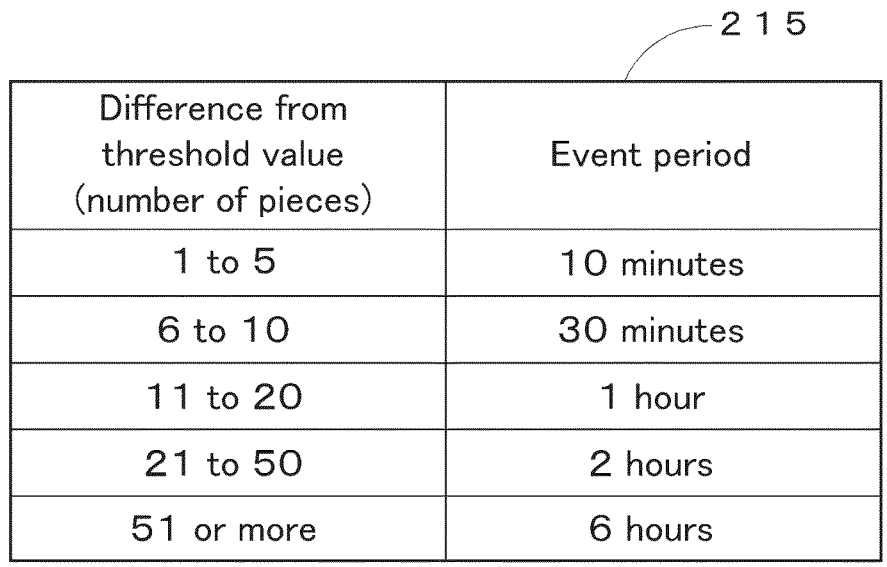
FIG. 10 is a diagram for explaining a specific example of an event generation period data table.

(Event Generation Period Data Table 215: FIG. 10)

As shown in FIG. 10, the event generation period data table 215 stores period information during which an image relating to an event is output to each terminal, namely, period during which an event has been generated on the operation screen of each terminal. According to the settings in the example shown in FIG. 10, the larger the difference between the number of pieces of a virtual item possessed by each virtual user and the predetermined threshold value, the longer the event generation period.

The virtual user data storage section 210 contains a possession item data table 221 and an attribute data table 222.

Figure 11:
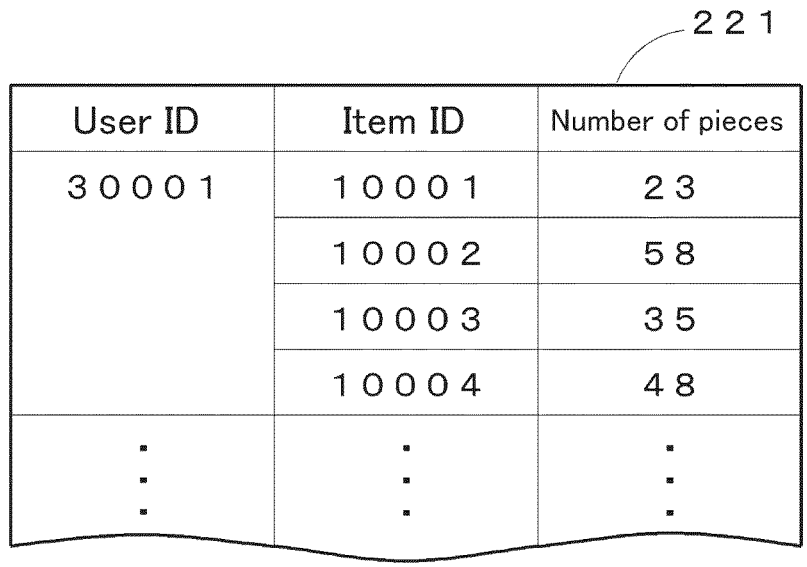
FIG. 11 is a diagram for explaining a specific example of a possession item data table.

(Possession Item Data Table 221: FIG. 11)

As shown in FIG. 11, the possession item data table 221 stores identification information (item ID) of the virtual item possessed by each virtual user, and the number of pieces of each virtual item. Specifically, the possession item data table 221 stores item ID and the number of pieces of a virtual item in possession corresponding to the item ID.

In the example of FIG. 11, the virtual user with the user ID 30001 possesses 58 pieces of virtual items (battle items) with the item ID 10002.

Figure 12:
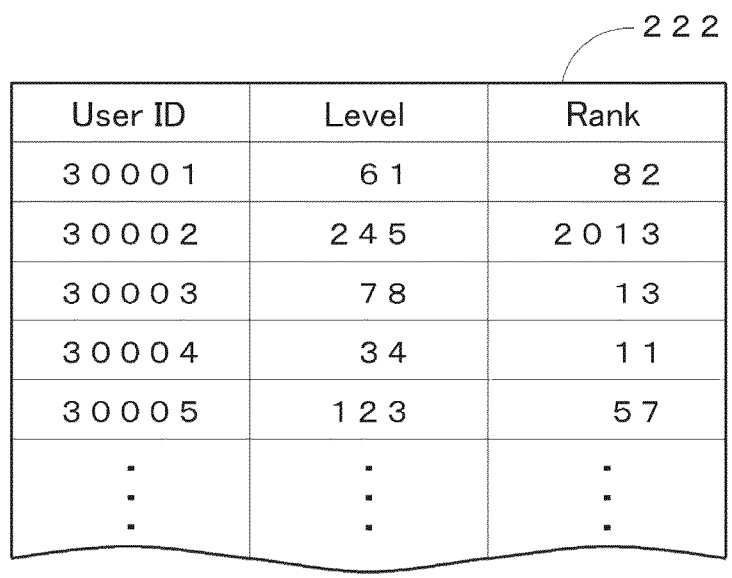
FIG. 12 is a diagram for explaining a specific example of an attribute data table.

(Attribute Data Table 222: FIG. 12)

As shown in FIG. 12, the attribute data table 222 stores an attribute value for each virtual user. Specifically, the attribute data table 222 shown in FIG. 12 is an example wherein level information and rank information of the virtual user are stored. Other examples of the attribute value to be stored may be information regarding the number of login times to the game, information regarding the number of fellows (the number other virtual users set as a "fellow" in the game).

The example shown in FIG. 12 indicates that the virtual user with the user ID 30001 is in the level 61 and is ranked at the 82nd rank.

(3-3-2) Configuration of Game Data Processing Section

Figure 5:
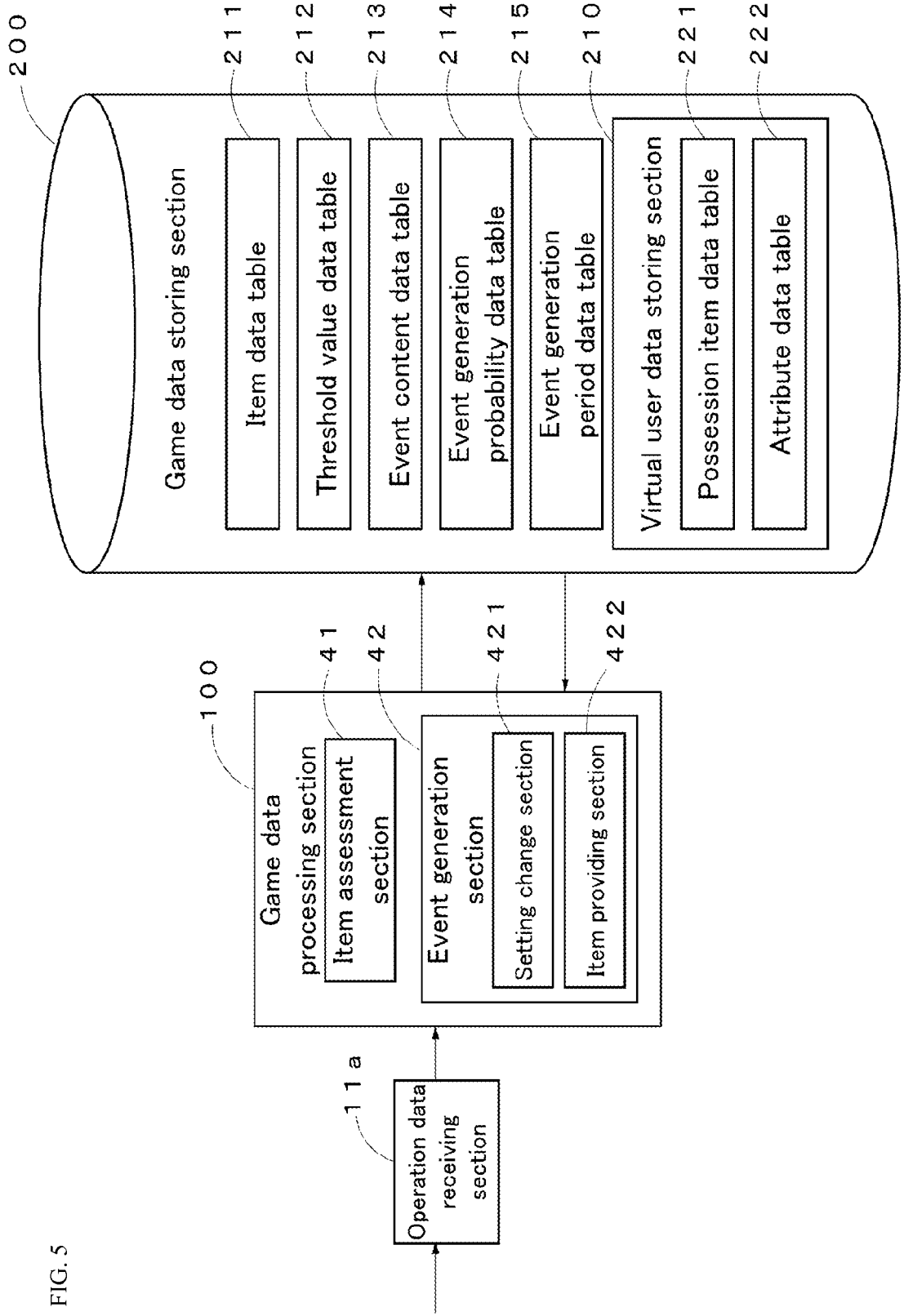
FIG. 5 is a diagram for explaining the overall flow of a game data processing section.

As shown in FIG. 5, the game data processing section 100 is provided with an item assessment section 41, and an event generation section 42.

The item assessment section 41 assesses whether or not the number of pieces of a virtual item possessed by the virtual user is equal to or more than the predetermined threshold value. One type of virtual item is selected from various types of virtual items possessed by the virtual user, and whether or not the number of pieces of the selected type of virtual item is equal to or more than the predetermined threshold value is assessed. The threshold value may be common among all virtual users, or may be different depending on the attribute values of each of the virtual users. The attribute values of the virtual user may a level, a rank, the number of fellows, the number of login times to the game, and the like.

The event generation section 42 is provided with a setting change section 421, and an item providing section 422. When the item assessment section assesses that the number of pieces of one type of virtual item possessed by the virtual user is equal to or more than the predetermined threshold value, the event generation section 42 generates an event in which the one type of virtual item can be consumed. Specifically, the setting change section 421 changes the settings of the game from the normal setting state to the event generation state. First, the setting change section 421 selects an event in which the one type of virtual item can be consumed. Then, the setting change section 421 determines the probability that the event is generated, and determines the period that the event continues. The setting change section 421 changes the settings of the game regarding overall event conditions including event generation probability, period, and the like. When the virtual user consumes the one type of virtual item in an event in which the one type of virtual item can be consumed, the item providing section 422 provides the virtual user with a virtual item other than the one type of virtual item consumed. First, the item providing section 422 determines a virtual item to be provided to the virtual user. Then, the item providing section 422 updates the data table in which the number of the determined virtual items possessed by the virtual user is stored. Further, the item providing section 422 outputs an image indicating that the virtual user acquires the virtual item which has been determined to be provided, to the terminal 3 operating the virtual user.

(4) Process in Game Server

As an example of a process in the game server 1 according to the present embodiment, the process of the game data processing section 100 having the aforementioned configuration will be explained.

(4-1) Outline of Processes in Game Data Processing Section

Figure 13:
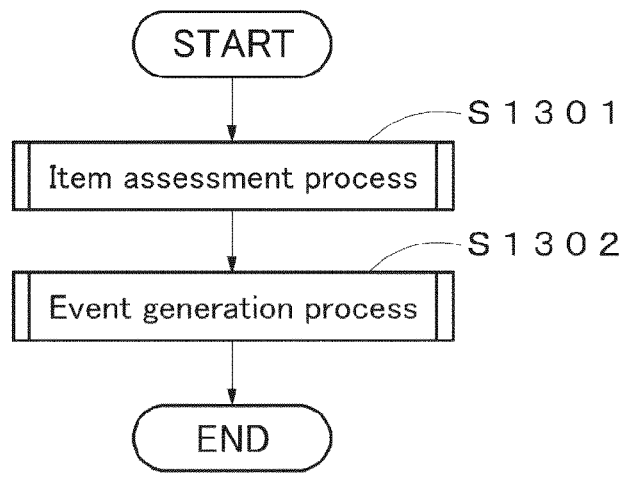
FIG. 13 is a diagram for explaining the overall flow of the processes performed by a game data processing section according to the present embodiment.

First, the outline of the processes in the game data processing section 100 will be explained with reference to FIG. 13. In Step S1301, a process to assess whether or not the number of pieces of a virtual item possessed by the virtual items is equal to or more than the predetermined threshold value (item assessment process) is executed. Subsequently, in Step S1302, a process to output an image relating to an event to the terminal operating the virtual user (event generating process) is executed. Hereinafter, as an example of the process in the battle part processing section 102, the content of the processes in Step S1301 and Step S1302 will be specifically explained with reference to FIG. 14 to FIG. 17. These processes are executed with respect to one virtual user (hereinafter, referred to as a noted virtual user). By executing the same processes to each virtual user, the item assessment process and the event generating process can be executed to all virtual users.

(4-2) Item Assessment Process

Figure 14:
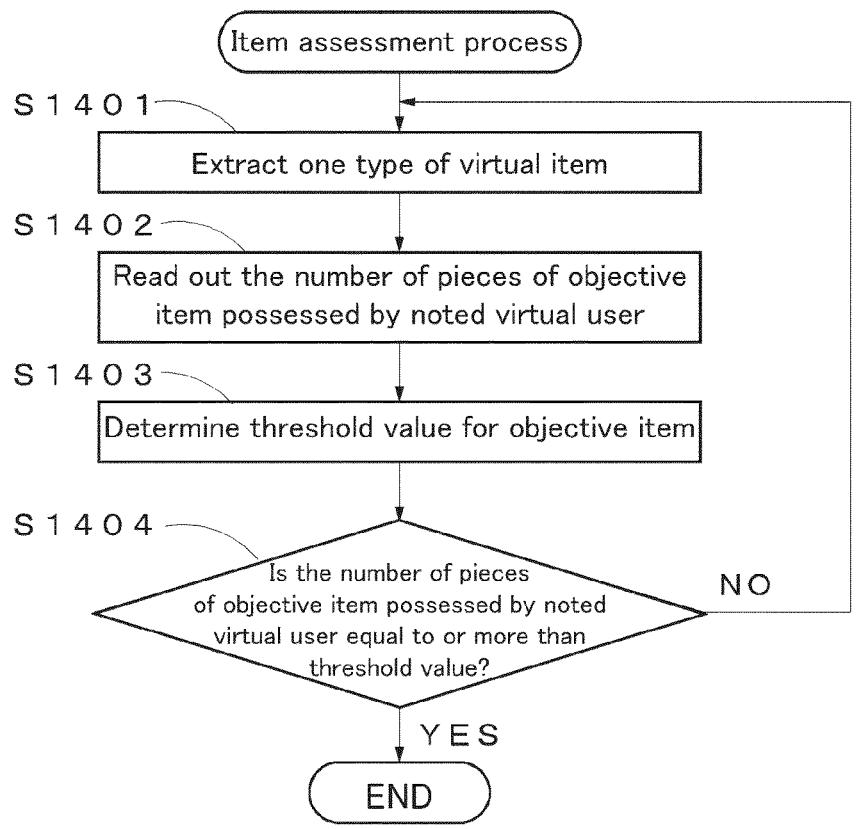
FIG. 14 is a diagram for explaining specific procedures of an item assessment process.

The details of the item assessment process in Step S1301 will be explained with reference to FIG. 14. As shown in FIG. 14, in Step S1401, the item assessment section 41 refers to the item data table 211 shown in FIG. 6, and selects one virtual item from a group of virtual items which can be used in a specific game. Hereinafter, the extracted virtual item is referred to as "objective item".

In Step S1402, the item assessment section 41 refers to the possession item data table 221 shown in FIG. 11, and reads out the number of pieces of an objective item possessed by the noted virtual user.

In Step S1403, the item assessment section 41 determines the threshold value regarding the objective item, with reference to the threshold value data table 212 shown in FIG. 7 and attribute data table 222 shown in FIG. 12. Specifically, the attribute value of the noted virtual user is read out from the attribute data table 222 shown in FIG. 11, and a threshold value is determined using the threshold value data table 212 shown in FIG. 7, on the basis of the read-out attribute value.

In Step S1404, the item assessment section 41 assesses whether or not the number pieces of the objective item possessed by the noted virtual user is equal to or more than the threshold value determined in Step S1403. Then the number of pieces of the objective item is equal to or more than the predetermined threshold value (Step S1404: YES), the process is terminated. On the other hand, when the number of pieces of the objective item is less than the predetermined threshold value (Step S1404: NO), the process returns to Step S1401, and the process of Step S1401 and thereafter is repeated.

Hereinafter, specific examples 1 and 2 of the item assessment process are shown. The specific example 1 is an example in which the threshold value is determined on the basis of the level of the noted virtual user, whereas the specific example 2 is an example in which the threshold value is determined on the basis of the rank of the noted virtual user. The virtual user with the ID 30001 is set as the noted virtual user. The virtual item (battle item) with the item ID 10002 is the objective item in Step S1401.

(4-2-1) Specific Example 1

According to the possession item data table 221 shown in FIG. 11, the virtual user with the user ID 30001 possesses 58 pieces of the virtual item with the item ID 10002 (Step S1402). According to the attribute data table 222 shown in FIG. 12, the virtual user with the user ID 30001 is in level 61, i.e., lower than level 100. Thus, according to the threshold value data table 212 shown in FIG. 7A, the item assessment section 41 determines that the threshold value is 50 pieces (Step S1403). Then, the item assessment section 41 assesses that the number of pieces of the virtual item with the item ID 10002 possessed by the virtual user with the user ID 30001 is equal to or more than the predetermined threshold value (Step S1404), and the process is terminated.

(4-2-2) Specific Example 2

According to the possession item data table 221 shown in FIG. 11, the virtual user with the user ID 30001 possesses 58 pieces of the virtual item with the item ID 10002 (Step S1402). According to the attribute data table 222 shown in FIG. 12, the virtual user with the user ID 30001 is ranked at 82nd rank, i.e., within the top 100 rank. Thus, according to the threshold value data table 212 shown in FIG. 7B, the item assessment section 41 determines that the threshold value is 100 pieces (Step S1403). Then, the item assessment section 41 assesses that the number of pieces of the virtual item with the item ID 10002 possessed by the virtual user with the user ID 30001 is less than the predetermined threshold value (Step S1404). The process returns to the step at which one virtual item is extracted from the item data table 211 shown in FIG. 6.

(4-3) Event Generating Process

Figure 15:
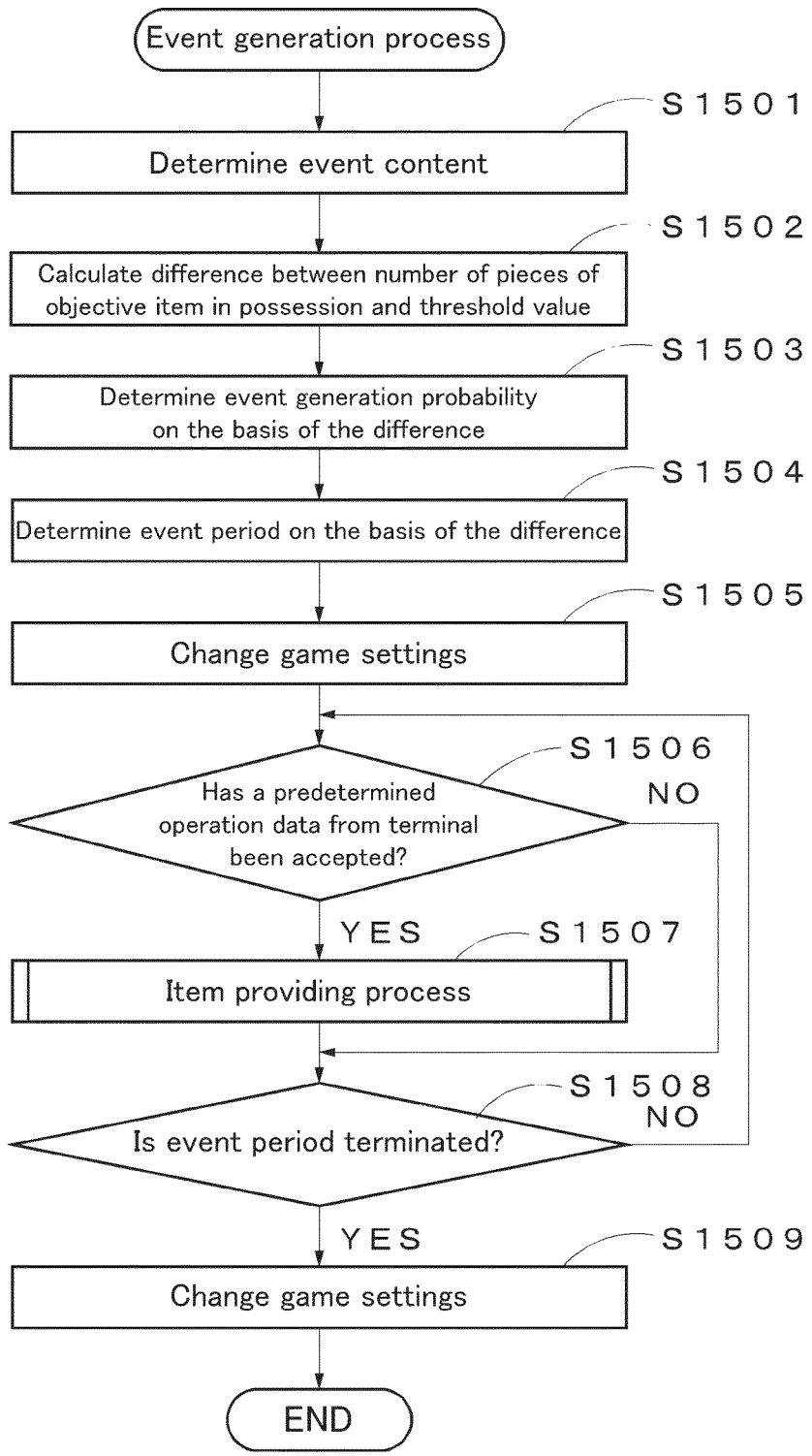
FIG. 15 is a diagram for explaining specific procedures of an event generation process.

The details of the event generating process in Step S1302 will be explained with reference to FIG. 15. As shown in FIG. 15, in Step S1501, the setting change section 421 determines the content of an event with reference to the event content data table 213 shown in FIG. 8. Specifically, an event in which the objective item can be consumed is selected. For example, when the virtual item with the item ID 10002 is the objective item, "monster appearance" event is selected as an event in which the virtual item with the item ID 10002 can be consumed.

In Step S1502, the setting change section 421 calculates the difference between the number of pieces of the objective item possessed by the noted virtual user and the threshold value determined in Step S1403. For example, in case of the above specific example 1, the virtual user with the user ID 30001 possesses 58 pieces of the virtual item with the item ID 10002, and the threshold value is 50 pieces. Therefore, the difference is 8 pieces.

In Step S1503, the setting change section 421 determines event generation probability on the basis of the difference calculated in Step S1502 and with reference to the event generation probability data table 214 shown in FIG. 9. For example, when the difference calculated in Step S1502 is 8 pieces, with reference to the event generation probability data table 214 shown in FIG. 9A, the monster appearance probability is determined as 5 monsters per area. According to the event generation probability data table 214 shown in FIG. 9B, the appearance probability of the highest ranked monster is determined 20%, the appearance probability of the next highest ranked monster is determined as 35%, and the appearance probability of the lowest ranked monster is determined as 45%.

In Step S1504, the setting change section 421 determines an event generation period on the basis of the difference calculated in Step S1502 and with reference to the event generation period data table 215 shown in FIG. 10. For example, when the difference calculated in Step S1502 is 8 items, according to the event generation period data table 215 shown in FIG. 10, the event generation period is determined as 30 minutes.

In Step S1505, the setting change section 421 executes a process to change the settings of the game regarding the noted virtual user, on the basis of the event generation probability determined in Step S1503. Specifically, the process to change the screen displayed on the terminal operating the noted virtual user from the normal setting state to the event generation state is executed. The change process will be explained with reference to FIG. 17A and FIG. 17B.

Figure 17A:
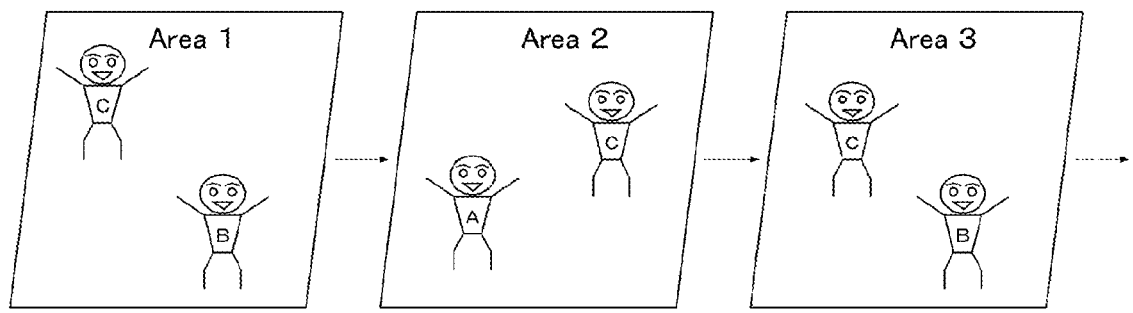
FIG. 17A is a diagram showing a normal setting state.
Figure 17B:
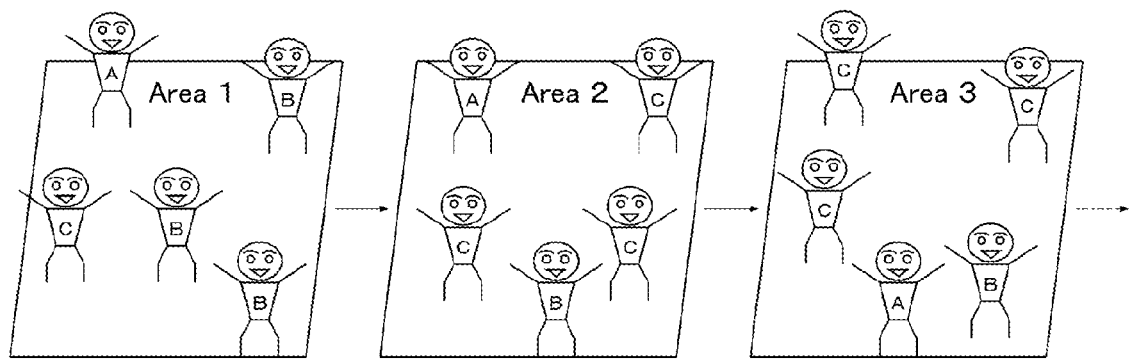
FIG. 17B is a diagram showing an event generating state.

FIG. 17A illustrates the normal setting state. FIG. 17B illustrates the event generation state. FIG. 17A and FIG. 17B show the state wherein monsters have appeared in areas 1 to 3 in the battle part. In normal setting state, according to the event generation probability data table 214 shown in FIG. 9A, 2 monsters appear in one area. In this state, probabilities are set such that the A ranked monster appearance probability is 10%, the B ranked monster appearance probability is 30%, and the C ranked monster appearance probability is 60%. Whereas, during the event generation state, 5 monsters appear in one area. In this state, probabilities are set such that the A ranked monster appearance probability is 20%, the B ranked monster appearance probability is 35%, and the C ranked monster appearance probability is 45%. By sequentially moving from one area after another, the virtual user encounters the monster appears in each area.

In Step S1506, the item providing section 422 judges whether or not predetermined operation data is received from the terminal 3 which operates the noted virtual user. Here, the predetermined operation data means, in case of, for example, the monster appearance event, the data regarding the attack to the monster by the noted virtual user. When the item providing section 422 judges that this operation data has been accepted (Step S1506: YES), the process proceeds to Step S1507, whereas, when the item providing section 422 judges that this operation data has not been accepted (Step S1506: NO), the process proceeds to Step S1508.

When the item providing section 422 judges that the above operation data regarding the attack to the monster has been accepted, the game server 1 separately executes a game process to judge whether or not the monster has been defeated by the attack operation. After the above operation data is judged as having been accepted, and the monster is judged as having been defeated through other process of the game, in Step S1507, the item providing section 422 executes a process of providing a virtual item to the noted virtual user (item providing process). The details of the item providing process will be described later below. When the item providing section 422 judges that the operation data has been accepted in Step S1506, but the game process judges that the monster has not been defeated in Step S1507, the process proceeds to Step S1508 and continues.

In Step S1508, the item providing section 422 judges whether or not the event generation period is terminated. When the event generation period terminates (Step S1508: YES), the process proceeds to Step S1509 to terminate the process relating to event generation, whereas when the event generation period is not terminated (Step S1508: NO), the process returns to Step S1506 and processes subsequent thereto are to be executed.

In Step S1509, the setting change section 421 executes a process to change the settings of the game regarding the noted virtual user. Specifically, the process to return the screen displayed on the terminal which operate the noted virtual user from the event generation state to the normal setting state.

(4-4) Item Providing Process

Figure 16:
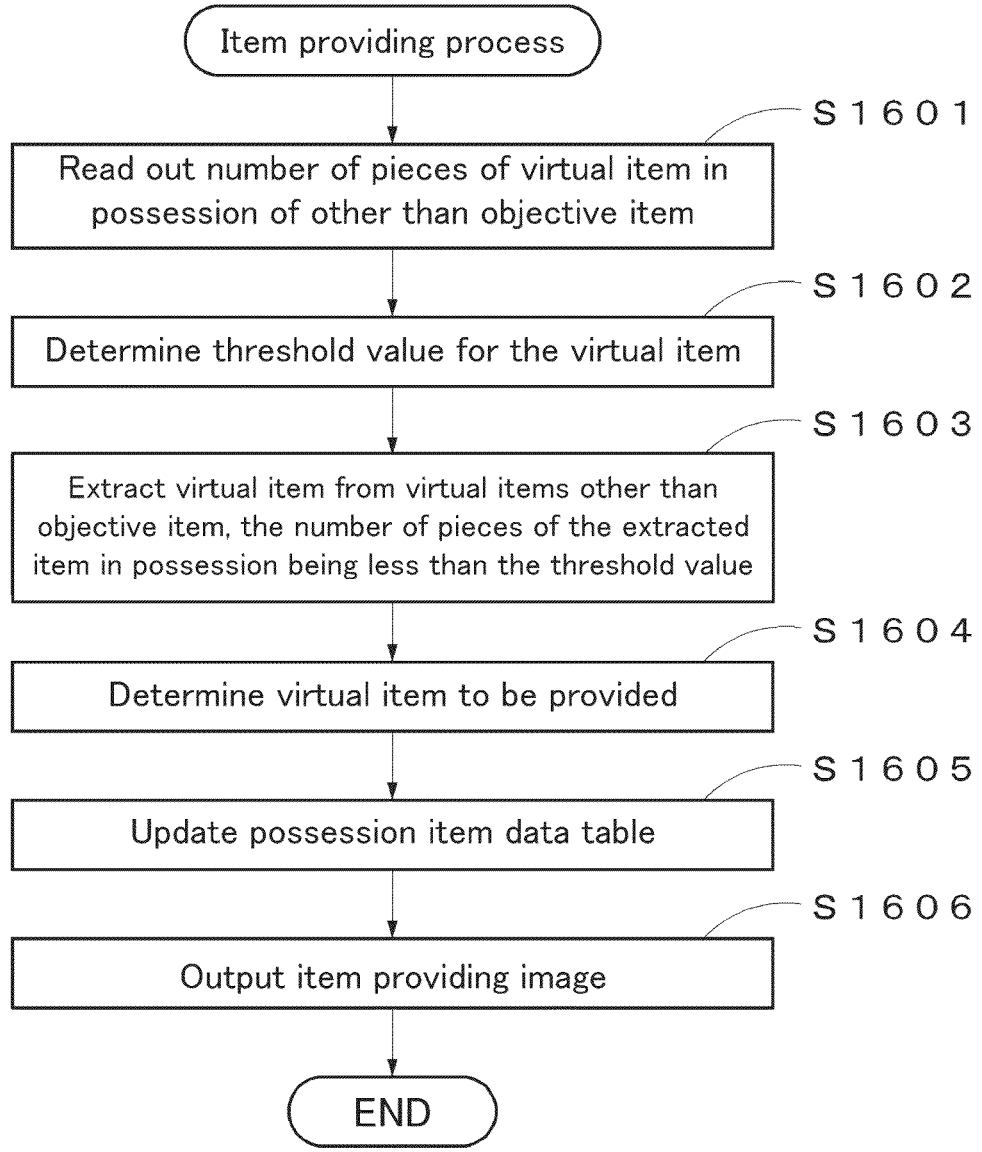
FIG. 16 is a diagram for explaining specific procedures of an item providing process.

The details of the item providing process in Step S1507 will be explained with reference to FIG. 16. As shown in FIG. 16, in Step S1601, the item providing section 422 refers to the possession item data table 221 shown in FIG. 11, and reads out the number of virtual items other than the objective item possessed by the noted virtual user. For example, the case where the objective item is the virtual item with the item ID 10002 is to be considered. According to the possession item data table 221 shown in FIG. 11, the virtual user with the user ID 30001 possesses 23 pieces of the virtual item with the item ID 10001, 35 pieces of the virtual item with the item ID 10003, and 48 pieces of the virtual item with the item ID 10004.

In Step S1602, the item providing section 422 refers to the threshold value data table 212 shown in FIG. 7, and determines the threshold value for the virtual item other than the objective item. The details of the process for determining the threshold value are the same as the process in Step S1403. For example, when the threshold value is determined on the basis of the level of the virtual user with the user ID 30001, according to the threshold value data table 212 shown in FIG. 7A, the threshold value for the virtual item with the item ID 10001 is 50 pieces, the threshold value for the virtual item with the item ID 10003 is 20 pieces, and the threshold value for the virtual item with the item ID 10004 is 50 pieces.

In Step S1603, the item providing section 422 extracts a virtual item from among virtual items other than the objective item, the extracted virtual item being the one for which the number of pieces possessed by the noted virtual user is less than the threshold value determined in Step S1602. For example, the virtual items to be extracted are: the virtual item (quest item) with the item ID 10001, 23 pieces of which being possessed and the threshold value of which being 50 pieces; and virtual item (combination item) with the item ID 10003, 48 pieces of which being possessed and the threshold value of which being 50 pieces. On the other hand, the virtual item (gacha item) with the item ID 10003 is not extracted, since 35 pieces of this virtual item are possessed while the threshold value therefor is 20 pieces.

In Step S1604, item providing section 422 determines the type and the number pieces of the virtual item to be provided to the noted virtual user. First, the type of the virtual item is the virtual item extracted in Step S1603, such as the quest item and the combination item. Next, on the basis of the predetermined operation data accepted in Step S1506, the number of pieces of the virtual item to be provided is determined. The upper the rank applied as the entity appeared in the event, the larger the number of pieces of the virtual item to be provided is set. For example, in the case of "monster appearance" event, when the virtual user defeats the A ranked monster, the virtual item to be provided is set as the one which has the most advantageous content.

In Step S1605, the item providing section 422 rewrites the number of pieces of the virtual item in possession stored in the possession item data table 221 shown in FIG. 11, with respect to the noted virtual user. Specifically, on the basis of the content of the virtual item to be provided which has been determined in Step S1604, the number of pieces of the virtual item in possession is increased.

In Step S1606, the item providing section 422 outputs an image indicating the virtual item which has been determined to be provided in Step S1604 (image of item to be provided), to the terminal which operates the noted virtual user.

(5) Operation

In the present disclosure, the item assessment section assesses whether or not the number of pieces of a virtual item possessed by the virtual user is equal to or more than the predetermined threshold value. When the number of pieces of a battle item in possession is assessed as equal to or more than the predetermined threshold value, the setting change section change the settings of the game so that the battle item can be consumed forcibly. Thereby, in the present disclosure, the physical user is provided with an opportunity for consuming surplus battle items. The physical user does not consume the surplus battle items in no relation to the game play, such as through "selling", etc., but can consume the battle items within the game play. Therefore, the physical user can maintain his/her motivation for playing the game.

In the specific example 1 of the item assessment process, the predetermined threshold value which is used upon assessment whether or not the number of pieces of the virtual item possessed by the virtual user is equal to or more than the predetermined threshold value, may vary depending on the level of the virtual user. When the level of the virtual user is low, the low threshold value is set. Thus, the number of pieces of the virtual item possessed by the virtual user can easily become equal to or more than the threshold value. In other words, when the virtual user is in the low level, event generation can easily occur. The fact that the virtual user is in the low level means that the number of operations from the start of the game is small and the operation time from the start of the game is short. In particular, a larger number of opportunities for consuming the virtual items are provided to the physical user operating such a low level virtual user. Thereby, physical users can be prevented from leaving the game when they have not played much, and can be encouraged to continue playing the game.

In the specific example 2 of the item assessment process, the predetermined threshold value which is used upon assessment whether or not the number of pieces of the virtual item possessed by the virtual user is equal to or more than the predetermined threshold value, may vary depending on the rank of the virtual user. When the rank of the virtual user is low, the low threshold value is set. Thus, the number of pieces of the virtual item possessed by the virtual user can easily become equal to or more than the threshold value. In other words, when the virtual user is in the low rank, event generation can easily occur. The fact that the virtual user is in the low rank means that the parameters in the game which are calculated for determining the rank are low. It is assumed that the parameters in the game are low because the number of operations from the start of the game is small and the operation time from the start of the game is short. In particular, a larger number of opportunities for consuming the virtual items are provided to the physical user operating such a low ranked virtual user. Thereby, physical users can be prevented from leaving the game when they have not played much, and can be encouraged to continue playing the game.

According to the present embodiment, setting change section sets the higher monster appearance probability when the number of pieces of the virtual item possessed by the virtual user is equal to or more than the predetermined threshold value, compared to the case when the number of pieces is less than the threshold value. Although monsters appear during the normal setting state, the number of the monsters is controlled so that a larger number of monsters appear in the event generation state. Thereby, the physical user is provided with opportunities for consuming battle items in order to attack the monsters. Accordingly, physical users are induced to consume battle items.

The setting change section sets the higher probability for the appearance of the upper ranked monster when the number of pieces of the virtual item possessed by the virtual user is equal to or more than the predetermined threshold value, compared to the case when the number of pieces is less than the threshold value. In other words, the number of times of the upper ranked monster appearance is controlled to be larger in the event generation state. Also, the upper the rank of the monster defeated by the virtual user, the more advantageous the virtual item to be provided to the virtual user by the item providing section. Accordingly, physical users are induced to consume battle items in order to acquire more advantageous virtual items.

Further, the larger the difference between the number of pieces of the virtual items possessed by the virtual user and the predetermined threshold value, the higher the monster appearance probability set by the setting change section. Also, the higher probability is set for the appearance of the upper ranked monster, when this difference is larger. Thereby, the physical user is provided with the larger number of opportunities for consuming battle items to attack monsters. Accordingly, physical users are induced to consume battle items.

In addition, the larger the difference between the number of pieces of the virtual items possessed by the virtual and the predetermined threshold value, the longer the event generation period set by the setting change section. Thereby, the physical user is provided with the larger number of opportunities for consuming surplus battle items. Accordingly, physical users are induced to consume more numbers of battle items.

In the present embodiment, when the virtual user consumes a battle item in an event, the item providing section provides a virtual item other than the battle item. Thereby, the physical user can substantially exchange the battle item for other virtual item through the play in the game, and thus, the surplus battle item can be effectively used. By obtaining other virtual item, the physical user can continuously use this other virtual item in the game. For example, by obtaining virtual items other than the battle items, the physical player can extensively play the game in the game part other than the part in which the battle item can be used. Thus, the physical user can be prevented from getting bored with the game.

As for this other virtual item, the item providing section may select a virtual item from among the virtual items possessed by the virtual user, the selected virtual item being the one that the number of pieces of which possessed by the virtual user is less than the predetermined threshold value. In the present embodiment, when the virtual user consumes one piece of a surplus virtual item, in exchange, one piece of another virtual item in shortage is provided so that the number of pieces of each virtual item possessed by the virtual user can be balanced. Thereby, surplus virtual items can be effectively used.

(6) Further Modified Example

In the present embodiment, the event generating process determines the event period in advance on the basis of the number of pieces of the objective item possessed by the noted virtual user and the predetermined threshold value. However, the event period is not necessarily determined in advance. For example, the item assessment section may terminate an event when the number of pieces of the objective item possessed by the noted virtual user becomes less than the predetermined threshold value, after the event generation section generates the event. Such a modified example of the event generating process will be explained with reference to FIG. 18. The processes in Step S1801 to S1806 and Step S1808 are the same as the processes in Step S1501 to Step S1503, Step S1505 to Step S1507, and Step S1509, and thus, the explanation therefor is omitted.

Figure 18:
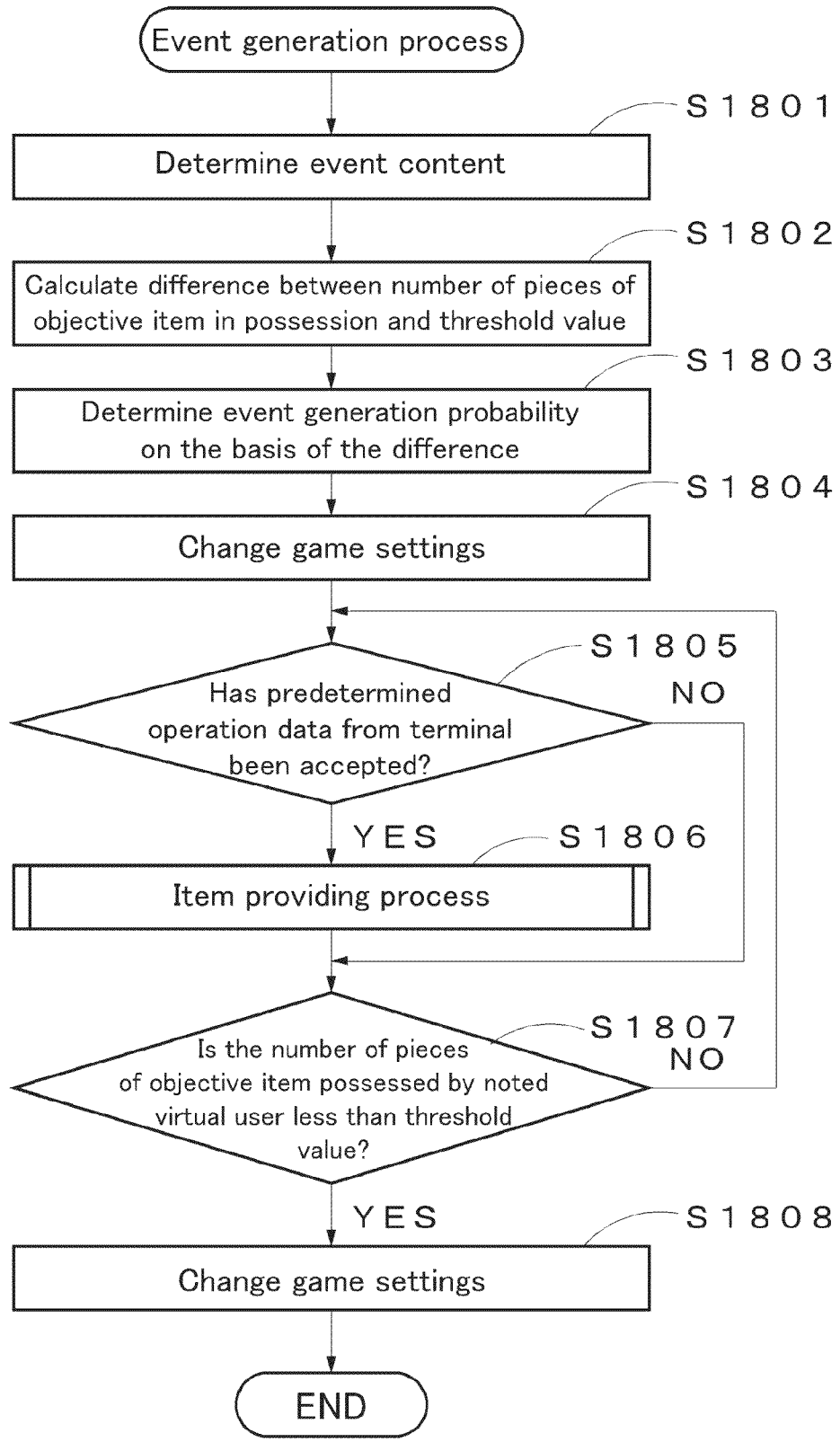
FIG. 18 is a diagram for explaining specific procedures regarding a modified example of an event generating process.

As shown in FIG. 18, in Step S1807, the item assessment section 41 assesses whether or not the number of pieces of the objective item possessed by the noted virtual user is less than the threshold value determined in Step S1403. When the number of pieces of the objective item is less than the predetermined threshold value (Step S1807: YES), the process proceeds to Step S1808. On the other hand, when the number of pieces of the objective item is equal to or more than the predetermined threshold value (Step S1807: NO), the process returns to Step S1805, and the processes of Step S1805 and the subsequent steps are repeated.

In the above modified example, the event period is extended until the number of pieces of the objective item possessed by the noted virtual user becomes less than the predetermined threshold value, and thus, the noted virtual user can certainly consume the surplus virtual items. Thereby, the physical user can have increased motivation for playing the game.

Also, in the present embodiment, even if the number of pieces of the objective item possessed by the noted virtual user does not decrease during the event period, no process is executed thereafter. However, for example, if the number of pieces of the objective item is equal to or more than the predetermined threshold value when the event is terminated, a process for setting the time limit after which the objective virtual item cannot be used may be executed. Such a modified example of the present embodiment will be explained with reference FIG. 19 and FIG. 20.

Figure 19:
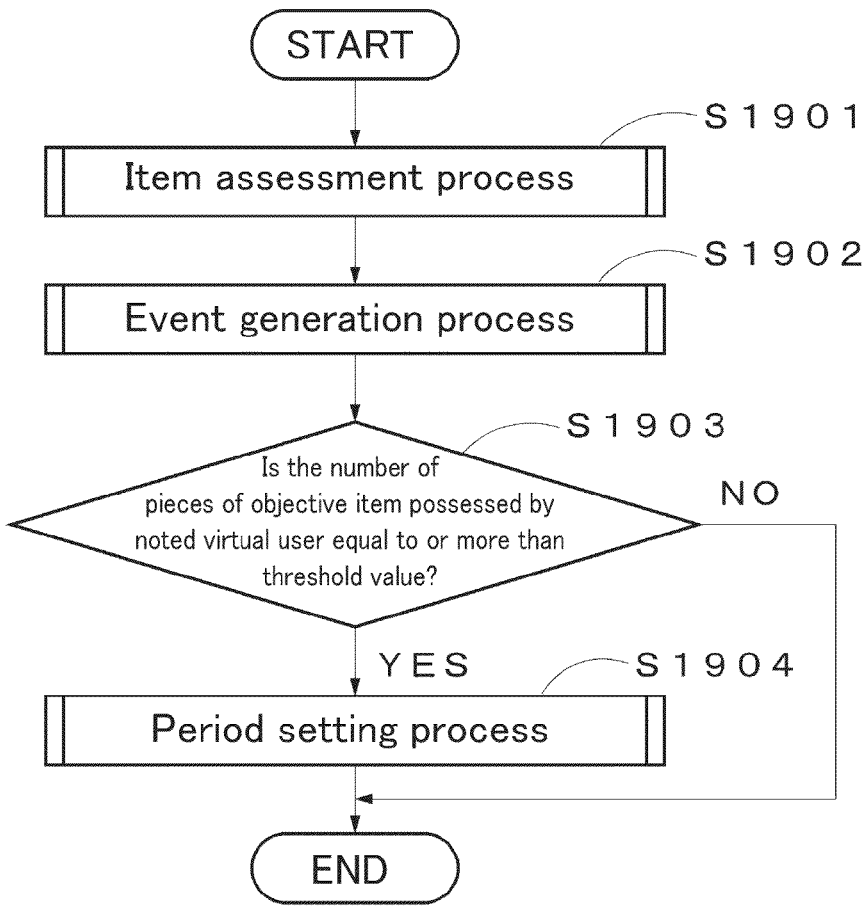
FIG. 19 is a diagram for explaining the overall flow of a game data processing section according to another embodiment.

As shown in FIG. 19, similar to FIG. 13, the item assessment process is executed in Step S1901, and subsequently, the event generating process is executed in Step S1902. Further, in Step S1903, the item assessment section 41 assesses whether or not the number of pieces of the objective item possessed by the noted virtual user is equal to or more than the threshold value determined in Step S1403 when the event is terminated. When the number of pieces of the objective item is equal to or more than the predetermined threshold value (Step S1903: YES), the process proceeds to Step S1904, and a process to set the time limit until which the objective item can be used (time limit setting process) is executed. On the other hand, when the number of pieces of the objective item is less than the predetermined threshold value (Step S1903: NO), this process is terminated. The time limit setting process will be described in detail below.

Figure 20:
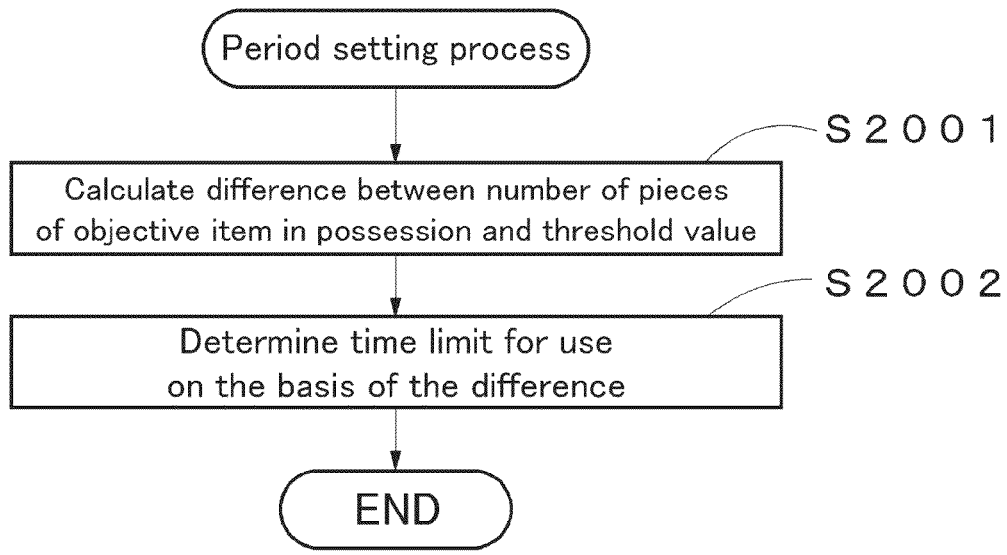
FIG. 20 is a diagram for explaining specific procedures of a time limit setting process.

As shown in FIG. 20, in Step S2001, the time limit setting section (not shown) calculates the difference between the number of pieces of the objective item possessed by the noted virtual user when the event is terminated and the threshold value determined in Step S1403.

In Step S2002, the time limit setting section determines the time limit until which the objective item possessed by the noted virtual user can be used on the basis of the difference calculated in Step S2001. Specifically, the larger the calculated difference, the longer time is determined before the time limit for use of the objective item. Further, with respect to the objective item possessed by the noted virtual user, the number of the items which the time limit for use is to be set, can be determined arbitrarily.

In the present example, the physical user has an impression that after the time limit for use, the objective item cannot be used and thus, will be wasted. Therefore, the physical user is led to consume surplus virtual items.

Also, present disclosure provides a non-transitory computer readable recording medium in which a software program which executes the functions of the above described embodiment is recorded, in a system or a device, and causing a system or a computer, i.e., CPU or MPU to read out and execute the software program recorded in the non-transitory storage medium.

In the above case, the program read out from the non-transitory computer readable recording medium realizes the functions of the above described embodiment, and therefore the program and the non-transitory storage medium in which the program is recorded are also an embodiment of the present disclosure.

Examples of the non-transitory recording medium which provides the program include a flexible disk, a hard disk, a magneto-optical disk, an optical disk such as a CD-ROM, a CD-R, a CD-RW, a DVD-ROM, a DVD-RAM, a DVD-RW and a DVD+RW, a magnetic tape, a non-volatile memory card, and a ROM. Alternatively, the program may be downloaded via a communication network.

Further, the functions of the above described embodiment may be accomplished not only by executing the program read out by a computer, but also by causing an operating system (OS) or the like which operates on the computer to perform a part or all of the actual operations based on instructions of the program.

Further, the functions of the above described embodiment may be accomplished by writing a program read out from the non-transitory recording medium into a memory provided on an expansion board inserted into a computer or a memory provided in an expansion unit connected to the computer, and then causing a CPU or the like provided in the expansion board or the expansion unit to perform a part or all of the actual operations based on instructions of the program.

In the present disclosure, an event in which surplus virtual items can be consumed is generated, and therefore, the surplus virtual items may not be deleted or sold, but can be consumed while playing the game. Thus, opportunities for effectively consuming surplus virtual items are provided.

In addition, the present disclosure may have following features. The item assessment section assesses whether or not the number of pieces of a virtual item possessed by the virtual user is equal to or more than a predetermined threshold value. The virtual item can be used in each game part such as a quest part, a battle part, and the like. For example, the virtual item may be a restoration item which has a function of restoring a quest point necessary for progressing the adventure rout in the quest part, or a restoration item which has a function of restoring a battle point necessary for fighting a battle with an enemy in the battle part. In the game, normally, points can be restored in process of time. However, with the use of the restoration item, points can be restored without waiting for the time to pass. The threshold value is a value set for each virtual item. The threshold value may be the same value shared by all virtual users, or may be a different value for each of virtual user depending on the attribute value of each virtual user.

The event generation section generates an event when the item assessment section assesses that the number of pieces of a virtual item is equal to or more than a predetermined threshold value. For example, the game settings are changed from the "normal setting state" to the "event generation state". The "event generation" may be achieved by adding a special element to the normal setting state in the game, or by changing an element in the normal setting state. For example, the event in which quest items can be consumed may be an event to emerge a special route in addition to the normal adventure route. This is an example of adding a special element to the normal setting state, and would provide an opportunity for consuming surplus quest items. The event in which battle items can be consumed may be an event to generate more numbers of monsters, i.e., enemies, than normal setting state. This is an example of changing the monster appearance ratio from that of the normal setting state. This would provide an opportunity for consuming surplus battle items.

In another embodiment of the game server according to the present disclosure, when the virtual user has consumed one type of virtual item, the event generation section may generate an event in which virtual items other than the type of virtual item can be obtained.

In this embodiment, for example, during the event in which a special route other than the normal adventure route is emerged, a reward for reaching the goal of the special route is set. The physical user consumes quest items in order to reach the goal of the special route. Upon reaching the goal, the physical user acquires a virtual item other than the quest item as a reward. Similarly, during the event in which a monster functioning as an enemy is generated, a reward for defeating the monster is set. The virtual user consumes battle items in order to attack the monster. When the monster is defeated, a virtual item other than the battle item can be obtained as a reward.

In this example, when one type of virtual item has been consumed in the game play, other type of virtual item can be obtained. Namely, virtual items are exchanged. At the time of item exchange the one type of virtual item is not directly exchanged to another type of virtual item, but the exchange can be performed through playing the game. In this way, surplus virtual items can be effectively used.

In another embodiment of the game server according to the present disclosure, the event generation section determines a virtual item the number of pieces of which possessed by the virtual user is less than the predetermined threshold value, and set as the virtual item which can be obtained.

In this embodiment, when the virtual user has consumed one type of virtual item, another type of virtual item in shortage is provided so that the number of pieces of each virtual item possessed by the virtual user can be balanced. The physical user can consume surplus virtual items and can add the virtual item in shortage. In this way, the surplus virtual items can be effectively used.

In still another embodiment of the game server according to the present disclosure, the event generation section sets the event generation probability higher when the number of pieces in possession is equal to or more than the predetermined threshold value, compared to the case where the number of pieces in possession is less than the predetermined threshold value.

In this embodiment, for example, to a monster functioning as an enemy to be appeared, high monster appearance probability is set. When the event generation probability is set high, more number of opportunities for the virtual user to consume the virtual item are provided.

In still another embodiment of the game server according to the present disclosure, after the event generation section generates the event, the item assessment section assesses whether or not the number of pieces of the one type of virtual item possessed by the virtual user is less than the predetermined threshold value. When the item assessment section assesses that the number of pieces of the one type of virtual item is less than the predetermined threshold value, the event is terminated.

In this embodiment, the event period is extended until the number of pieces of the objective item possessed by the virtual user becomes less than the predetermined threshold value. Thus, the virtual user can certainly consume the surplus virtual items, and the physical user can be motivated to play the game.

In still another embodiment of the game server according to the present disclosure, the item assessment section assesses whether or not the number of pieces of the one type of virtual items is equal to or more than the predetermined threshold value when the event is terminated. A time limit setting section is further provided, and the time limit setting section sets the time limit for use of the one type of virtual item when the item assessment section assesses that the number of pieces of the one type of virtual item is equal to or more than the predetermined threshold value.

In this embodiment, if the number of the pieces of the objective item does not become less than predetermined threshold value although the event generation section generated an event, the time limit for using the objective item is set. After this time limit for use, the objective item cannot be used. Therefore, the physical user can be led to consume the surplus virtual items.

It is to be understood that functions of the above embodiments according to the present disclosure can be accomplished not only by the game server itself, but also a game controlling method which controls the progress of the game provided by the game server, a game program, a game program recording medium in which the game program is recorded, and a game system.

While the present disclosure has been described with reference to exemplary embodiments, it is to be understood that the present disclosure is not limited to the disclosed exemplary embodiments. The present disclosure is to be afforded the broadest interpretation so as to encompass all such modifications and equivalent structures and functions.

What is claimed is:

1. A game server which manages actions of a virtual user present in a virtual space in response to operation data from each terminal connected through a communication network, wherein a game provided to the terminal comprises a plurality of game parts which are formed according to function, the game server comprises, a storage unit which stores information of a virtual item, wherein the virtual item is consumed in the game, is set for each of said game parts, is accumulated as a possession item of the virtual user when the virtual user acquires the virtual item, and is consumed on the basis of the operation data received from the terminal which controls the virtual user, and the game server comprises, a processing section which assesses whether or not the number of pieces of a virtual items possessed by the virtual user is equal to or more than a predetermined threshold value, and which adds a new predetermined event when the processing section assesses that the number of pieces of one type of virtual item is equal to or more than the predetermined threshold value, and which determines a game part in which said virtual item is consumed, and adds the predetermined event in the game part in which said one type of virtual item is consumed.

2. A game server according to claim 1, wherein as for said predetermined event, the processing section adds an event wherein the virtual user can acquire another type of virtual item different from said one type of virtual item, by consuming said one type of virtual item.

3. A game server according to claim 2, wherein the processing section extracts, from among virtual items possessed by the virtual user, a virtual item the number of pieces of which in possession is less than the predetermined threshold value, and adds an event wherein the extracted virtual item is obtained as said another type of virtual item.

4. A game server according to claim 1, wherein the processing section sets probability for generating the event higher when the number of pieces in possession is assessed as equal to or more than the predetermined threshold value, compared to the case where the number of pieces in possession is assessed as less than the predetermined threshold value.

5. A game server according to claim 1, wherein after the processing section generates said event, the processing section assesses whether or not the number of said one type of virtual item possessed by the virtual user is less than the predetermined threshold value, and when the number of pieces of said one type of virtual item is less than the predetermined threshold value, the processing section terminates said event.

6. A game server according to claim 1, wherein the processing section assesses whether or not the number of items of said one type of virtual item is equal to or more than the predetermined threshold value when the event is terminated, and the processing section sets a time limit for use with respect to said one type of virtual item, when the number of pieces of said one type of virtual item is equal to or more than the predetermined threshold value.

7. A game server, according to claim 1, wherein the processing section sets a time limit for use with respect to said one type of virtual item, in case where the processing section assesses that the number of pieces of said one type of virtual item is less than a predetermined time limit value when the event is terminated.

8. A game controlling method executed by a game server according to claim 1 the game computer controlling method comprising the following steps of:

assessing whether or not the number of pieces of a virtual item possessed by the virtual user is equal to or more than the predetermined threshold value, and adding the new predetermined event when the number of pieces of one type of virtual item is assessed as equal to or more than the predetermined threshold value, and wherein during the step for adding the predetermined event, the game part in which said one type of virtual item is consumed is determined, and said predetermined event is added to the game part in which said one type of virtual item is consumed.

9. A non-transitory computer readable recording medium which stores a game program, when executed by the game server according to claim 1 the game server executes the following steps of:

assessing whether or not the number of pieces of a virtual item possessed by the virtual user is equal to or more than the predetermined threshold value, and adding the new predetermined event when the number of pieces of one type of virtual item is assessed as equal to or more than the predetermined threshold value, determining the game part in which said one type of virtual item is consumed, during the step for adding the predetermined event, and adding said predetermined event to the game part in which said one type of virtual item is consumed, wherein virtual items accumulated as the possession items is consumed on the basis of the operation data received from the terminal which controls the virtual user.

10. A game system comprising:

the game server according to claim 1, and at least one terminal connected to the game server through a communication network, wherein the terminal comprises an operation input section which accepts the operation data.

* * * * *